United States Patent [19]
Aldridge
[11] 4,333,083
[45] Jun. 1, 1982

[54] ELECTROSTATIC DROP SENSOR WITH SENSOR DIAGNOSTICS FOR INK JET PRINTERS

[75] Inventor: Stephen F. Aldridge, San Jose, Calif.

[73] Assignee: International Business Machines Corporation, Armonk, N.Y.

[21] Appl. No.: 219,478

[22] Filed: Dec. 23, 1980

[51] Int. Cl.$^3$ ........................ G01D 9/00; G01D 15/18
[52] U.S. Cl. ........................................ 346/1.1; 346/75
[58] Field of Search ........................... 346/75, 140, 1.1

[56] References Cited

U.S. PATENT DOCUMENTS 3,836,912 9/1974 Ghougasian et al. ................. 346/75
3,852,768 12/1974 Carmiachel et al. ................. 346/75
3,886,564 5/1975 Naylor et al. ......................... 346/75
3,953,860 4/1976 Fujimoto et al. ..................... 346/75
3,977,010 8/1976 Erickson et al. ...................... 346/75
4,101,906 7/1978 Dahlstrom et al. ................... 346/75
4,121,223 10/1978 Omori et al. .......................... 346/75
4,158,204 6/1979 Kuhn et al. ........................... 346/75
4,167,013 9/1979 Hoskins et al. ....................... 346/75
4,167,014 9/1979 Darling et al. ........................ 346/75

*Primary Examiner*—Donald A. Griffin
*Attorney, Agent, or Firm*—Shelley M. Beckstrand

[57] ABSTRACT

A sensor system for ink jet printers provides an output signal selectively indicative of the passage of an electrostatically charged ink drop, and of the proper operation of the sensor. The sensor includes a plurality of spaced conductors, between which the ink jet stream passes. During normal operating mode, at least one of the conductors is connected to a reference voltage for shielding the other conductors from electrical noise, conditioning the other conductors to generate an output signal induced by capacitive coupling of a charged ink drop. During test mode, at least one conductor is connected to signal generator for capacitively inducing a test signal into the other conductors to generate an output signal indicative of proper operation of the sensor.

11 Claims, 6 Drawing Figures

ELECTROSTATIC DROP SENSOR WITH SENSOR DIAGNOSTICS FOR INK JET PRINTERS

BACKGROUND OF THE INVENTION (1) Field of the Invention

This invention has particular utility in the field of ink jet printing and, more particularly, to a multi-layered ceramic electrostatic drop sensor with sensor diagnostic feature.

(2) Description of the Prior Art

In ink jet printers of the type where an ink jet head traverses along a print line on a paper at a velocity which varies as a function of time, it is necessary to provide on-the-fly determination of the correct lead distance over which to release ink drops so as to cause accurate placement of the drops on the paper by simultaneously measuring the head transport induced stream velocity $V_n$ and quickly performing the calculation for the lead time d based upon a measured value of drop flight time $T_f$.

The relationship between velocity components $V_n$, $V_s$, and $V_r$ is shown in a publication by H. W. Johnson, "Drop Velocity Compensation In Moving Head Ink Jet Printers", IBM Technical Disclosure Bulletin, Vol. 20, No. 11B, April 1978, pp. 4920-21, along with a diagram which shows the relationship between s, d, and r where $V_h$ = head transport velocity
$V_s$ = pump pressure induced stream velocity
$V_r$ = resultant drop velocity
d = head displacement during drop flight or horizontal component of drop displacement during flight
s = distance from drop break-off point to paper
r = resultant drop displacement Since the corresponding angles of the triangles are equal, the triangles are similar, and $$d/s = V_h/V_s$$

$$d = SV_h/V_s$$

But $s/V_s$ is the drop flight time, $T_f$, and (neglecting aerodynamic and other effects)

$$d = V_h T_f$$

The significance of d is that it is the component of drop displacement that is parallel to the paper and thus represents the amount of "lead" required when releasing a drop in order to place it at a desired location on the paper, or recording medium.

The flight time, $T_f$, can be measured both statically and dynamically. The static measurement is taken with the head stationary and aligned at a service station with a flight time sensor off to one side of the recording medium, as is suggested by U.S. Pat. No. 3,977,010 (Erickson, et al). U.S. Pat. No. 4,176,363 (Kasahara) describes an ink jet printing apparatus, and includes an illustration of position C where certain tests may be performed on the head 12. Kasahara describes, therefore, the positioning of a head at a "service station" as is referenced in Erickson, et al.

Various sensor structures and circuitry for measuring flight time and other ink jet drop stream characteristics have been suggested in the prior art. These include the following:

U.S. Pat. No. 3,852,768 (Carmichael, et al) describes charge detection for ink jet printers. An assembly of laminar elements including a sensor element, an inner shield, and an outer shield has an aperture through which ink drops pass. The drops passing through the aperture are capacitively coupled to the sensor for generating charges thereon in timed relation to passage of the drops. A loss in signal output from the sensor indicates stream failure. The laminar elements comprise alternate sheets of copper and Mylar*
(*Registered Trademark of Dupont).

U.S. Pat. No. 3,886,564 (Naylor, et al) describes a deflection sensor for ink jet printers involving differential sensing of signals developed from charged drops, and having utility in sensing, inter alia, drop velocity and ink stream failure.

U.S. Pat. No. 3,977,010 (Erickson, et al) describes a dual sensor for multi-nozzle ink jet, which selectively measures flight time or stream alignment of electrostatically charged drops. During the test cycle, the head to be tested is moved to a service station off to one side of the recording medium, and selector 135 operated to select the sum (flight time) measurement or the difference (alignment) measurement (see FIG. 10). Erickson further teaches the use of flight time measurements (where flight time is the inverse of velocity) to adjust the pressure or viscosity of the ink, and for indicating a charge electrode failure or improper synchronization of the charge signal in the head.

U.S. Pat. No. 4,121,223 (Omori, et al) describes an ink sensor including a copper/insulator laminated structure mounted to the ink gutter for detecting error in the phase between emission of ink droplets out of a nozzle and the charging thereof.

U.S. Pat. No. 4,101,906 (Dahlstrom, et al) describes a charge electrode assembly for an ink jet printer including a nonconductive ceramic with grooves into which a passive noble metal, such as platinum or rhodium, is sputtered to form a conductive layer. Such a structure is found to be resistant to degradation by the impingement of pressurized ink jet streams or electrochemical attack.

U.S. Pat. No. 4,158,204 (Kuhn, et al) describes a time correction system for multi-nozzle ink jet printer. A sensor positioned downstream from a nozzle in the path of the ink drops is used to determine the flight time, which may vary due to nozzle imperfections, chearances, accumulations and deposits of ink. The calculated flight time is used to control the time at which information signals are applied to each of a plurality of charge electrodes during printing.

U.S. Pat. No. 3,953,860 (Fujimoto, et al) describes a charge amplitude detection apparatus for an ink jet printer. The amplitude of charge on phase detecting drops is detected by electrostatic induction in a panel or strip shaped detection electrode adjacent the wake of the ink drops.

U.S. Pat. No. 3,836,912 (Ghougasian, et al) describes a drop charge sensing apparatus for an ink jet printing system. The sensing element includes a conductive member placed downstream from a charging station proximate to, but in non-impinging relationship with the droplet stream. The electrostatic charge on each drop is sensed by the inductive charge sensing member, and used to control the sychronization of ink droplet formation and the application of video charging signals to the ink droplet stream.

U.S. Pat. Nos. 4,167,013 (Hoskins, et al) and 4,167,014 (Darling, et al) describe circuitry for perfecting ink drop printing at nonlinear, or varying, carrier velocity. In each, it is assumed that the drop velocity is a contstant, and circuitry is provided for calculating the lead time for a given print position for varying print head velocities.

In the above references, apparatus is provided for sensing the charge on charged ink drops. Such sensors deal with very weak field intensities and therefore with very small signal currents. Consequently, the physical environment of the drop sensor, including the wetness and contaminants of the ink, tends to degrade the operation of the sensor and result in sensor failure. Further, errors and failures can occur in the electronic circuitry associated with the sensor. Consequently, it is desirable and advantageous to provide a sensor which, without human intervention, is capable of measuring drop flight time, while also detecting failure in the ink drop forming head, failure in the sensor antenna plates, and failure in the sensor electronics.

SUMMARY OF THE INVENTION

In accordance with this invention, an electrostatic drop sensor comprises a plurality of spaced conductive members on opposite sides of an ink jet stream. An amplifier circuit connected to the conductive members develops an output signal in response to capacitively coupled charges from electrostatically charged ink drops in the ink jet stream passing through the sensor. The output signal is thereafter processed to measure the flight time.

An electrical signal source is provided for generating a drop simulating signal. Switching means are provided for selectively connecting at least one of the conductive members on each side of the ink jet stream to a reference potential to shield the other members for generation of the flignt time measurement, and at least one of the conductive members to the electrical signal source to capacitively induce a test signal into the other conductive members to provide an output signal indicative of proper operation of the combination of amplifier circuit and conductive members.

By a further aspect of the invention, circuit means are provided for converting and switching the electrical signal source to test the amplifier circuit.

DESCRIPTION OF THE PREFERRED EMBODIMENT

As previously explained, the control of drop placement in ink jet printing relies in part upon the drop flight time $T_f$ measured from the head to the paper plane. This measurement may be performed utilizing the output signal of the electrostatic drop sensor of the present invention.

Figure 1:
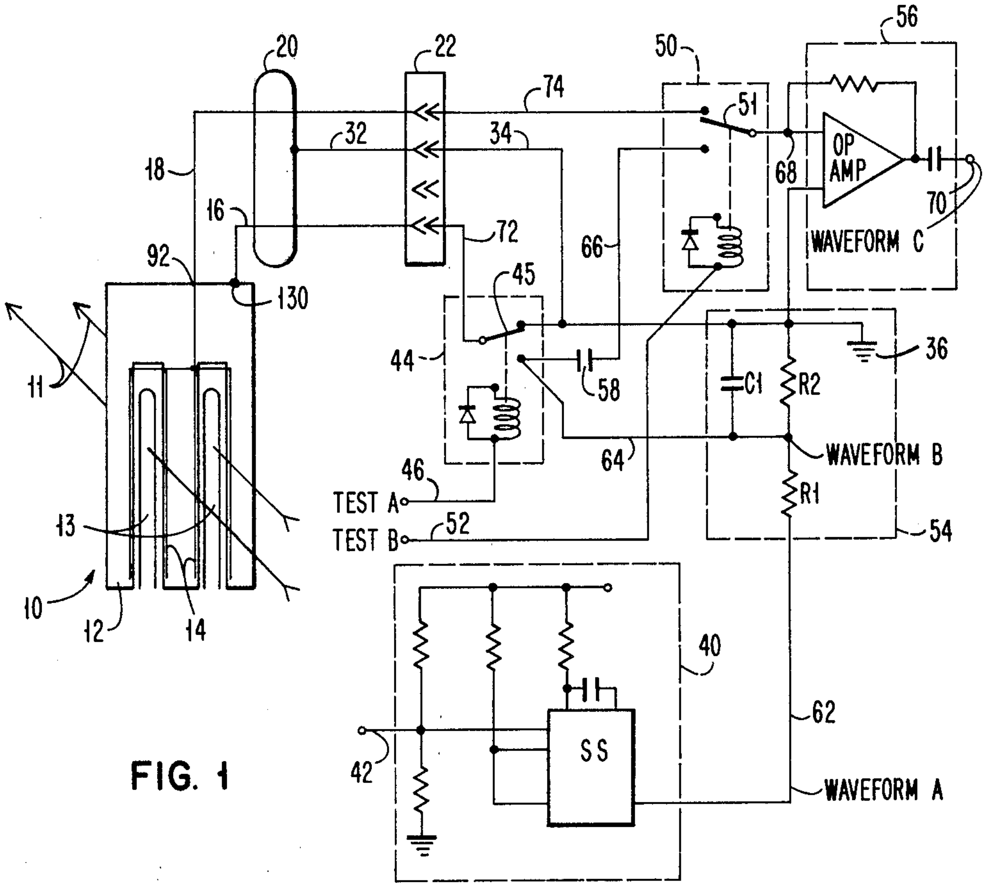
FIG. 1 is a schematic circuit diagram of the drop sensor amplifier and test circuits.

Referring to FIG. 1, the print head is positioned at drop sensor 10 and operated to provide a stream 11 of one or more electrostatically charged ink drops through channels 13. The structure of sensor 10, which will be more fully explained in connection with FIGS. 3–6, includes a front shield plane 12, one or more sensor antenna planes 14, and a back shield plane (102, FIGS. 5, 6) assembled in the multi-layered ceramic (MLC) structure of FIG. 6.

FIG. 1 provides an electrical schematic of the electrostatic drop sensor and supporting self-test circuitry. By this circuitry, a failure in the sensor structure or electronics is located. The sensor also determines if the ink streams are actually issuing from the print head, and since no operator intervention is necessary, is particularly useful for automatic verification of the head start-up stream. The outside ground shields 12, 102 are parallel to the sensor antenna planes 14, thus providing a distributive capacitance between outer layers 12, 102 and the inner layers 14. This capacitance is used to couple into sensor antenna planes 14 an electrical charge which is similar to the normal ink jet charged drops "fly by" signal.

In FIG. 1, sensor shields 12, 102 are connected together and to line 16 by via hole 130. Sensor antenna planes 14 are connected together and to line 18 by via hole 92. Connector 22 connects line 18 to line 74, line 16 to line 72, and wire mesh shield 20 via lines 32 and 34 to a reference potential, herein ground 36. Relay 44 is selectively operated by a TEST A signal on line 46 to position switch 45 to the off position (shown) for connecting antenna shields 12 to ground 36.

Figure 2:
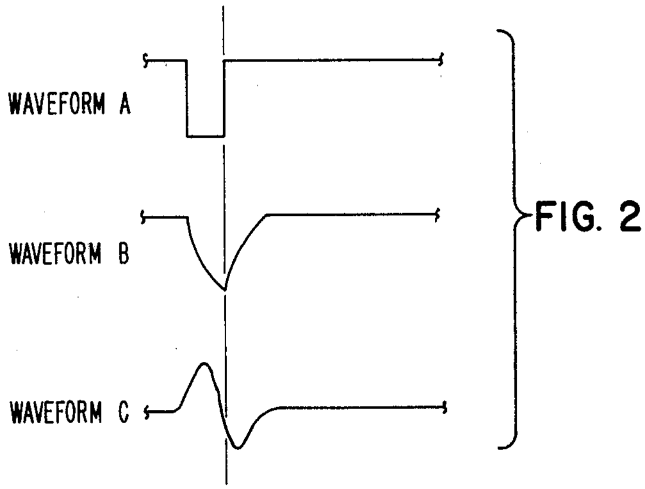
FIG. 2 is a plot of waveforms of the output of the pulse generating circuit, the input to the shield, and the current across the sensor planes of FIG. 1.

Pulse generating circuit 40 is responsive to a test signal at point 42 to generate wareform A (FIG. 2) on line 62. Line 62 is connected to RC filter 54 which shapes waveform A into waveform B (FIG. 2) on line 64. Line 64 is selectively connected through relay 44 switch 45 to sensor shield 12, and through capacitor 58 and relay 50 switch 51 to operational amplifier 56 input node point 68.

Relay 44 is operated by a TEST A signal on line 46, and relay 50 is operated by a TEST B signal on line 52.

In operation, during normal operation (for measuring drop flight time), sensor shields 12, 102 are connected to ground 36 through switch 45 to shield sensor antennas 14 by preventing extraneous electrical noise from being picked up by sensor antennas 14. Sensor antennas 14 are connected through switch 51 to transconductive amplifier (OP AMP) 56, wich converts the current at node point 68 to a voltage at 70, providing waveform C (FIG. 2) at output 70—which waveform C will be emloyed by circuitry (not shown) to determine the flight time, $T_f$. The grounded shields 12 allow the charge field of the electrostatically charged ink drops 11 to influence antenna plates 14 only during the time the drops 11 are inside gap 13 between the plates. This effect has the tendency to shape the sensor charge current, which increases the fundamental frequency and improves the ability of the signal processing circuits, including OP AMP 56, to measure drop flight time.

In further operation, during sensor head self-test mode of operation, switch 45 is operated by a TEST A signal at 46 to remove sensor shields 12 from ground 36, and connect them to resistive/capacitor filter 54. Filter 54 is excited by a digital pulse generated by single shot 40, the output of which is heavily filtered to produce a shaded pulse. The combination of resistor R1 and impedance of C1 plus R2 sets the level of the pulse applied to shield 12 of sensor 10. By the action of distributive capacitance, an electrostatic charge is coupled to sensor antennas 14 which results in a differentiated nodal current flow at 68, which simulates a charged drop fly-by electrostatic field. This current pulse is then amplified, filtered, and processed, just as a normal charged drop produced signal.

In yet further operation, during sensor electronics self-test mode of operation, the linear amplifier/filter electronics are tested by operating switch 45 to connect shield 12 back to ground 36, and by operating switch 51 to switch amplifier 56 input 68 through capacitor 58 to RC filter 54/pulse generating circuit 40—the self-test circuit. Since amplifier 56 input is a current node type, capacitor 58 converts the test pulse on line 64 from voltage to a differentiated current pulse, just as the distributive capacitance between ground shield 12 and antenna plates 14 in the sensor head self-test mode. This current at 68 is then amplified and processed just as a normal charged drop 11 produced signal.

Thus, the circuitry of FIG. 1 can be used to determine, for example, when no flight time pulse is received at output 70 during normal operation, if the problem exists in electrostatic drop sensor 10, the support electronics 40, 54, 56, or elsewhere. The procedure for isolating the problem (when no flight time pulse is received at output 70 during normal operation) is as follows. First, perform the sensor head self-test operation and then, if no signal is received at output 70, perform the sensor electronics self-test. If a signal is then received at output 70, a problem exists in sensor 10 itself. If a signal was received at output 70 during the sensor head self-test operation, then the problem is either the print head or head support components (for example, the print head is not aligned to the sensor or is not generating a stream of charged drops)—but sensor 10, sensor support electronics, cables, and components are all operational. If no signal is received at output 70 during the sensor electronics self-test operation, then a problem exists in the sensor electronics.

Sensor 10 comprises a multi-layer ceramic (MLC) head, fabricated to deal with very weak field intensities and therefore with very small signal currents, yet still be capable of operation in a hostile environment characterized by the wetness and contaminants introduced by the ink stream 11. MLC technology provides for the encapsulation of metalized layers within a ceramic material, thus passivating and thereby protecting the metalization within a layer of ceramic. Further, a non-wetting layer of fluro-ethelyene-propylene may be coated over the entire surface of sensor 10 exposed to the ink. This layer causes the ink-surface to break up into small droplets on the surface of sensor 10, which small droplets are unable to short to ground or effectively shield the plates of the sensor, and also aids in removing paper dust during start-up and shut-down due to the washing action of streams 11 on sensor 10. Without such a non-wetting layer, a conductive ink layer on sensor 10 partially shields the sensor antenna plates 14 from the electrostatic field of charged drops 11, particularly if this layer of ink is also contacting a ground return, such as sensor shield plates 12. On the other hand, if the layer of ink is not contacting a ground, it has the tendency to pick up electrical noise, such as 60 cycle and radio frequency, and then couple this noise to sensor plates 14.

Figure 3:
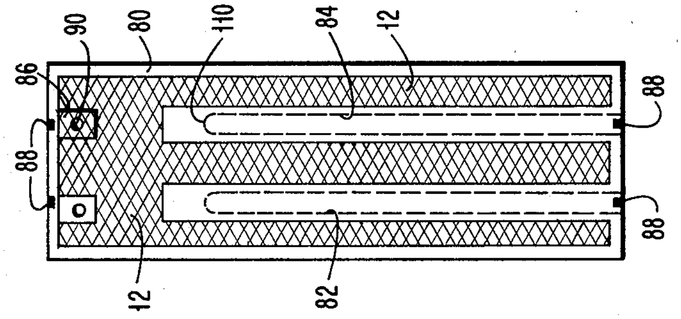

Referring to FIG. 3, the front shield plane comprises metalized layer 12 deposited in the M pattern shown on ceramic substrate 80. Fiducials 88 are deposted for alignment for grinding out slots 82 and 84. A via hole 90 is provided for use in establishing electrical contact to ground plane 12.

Figure 5:
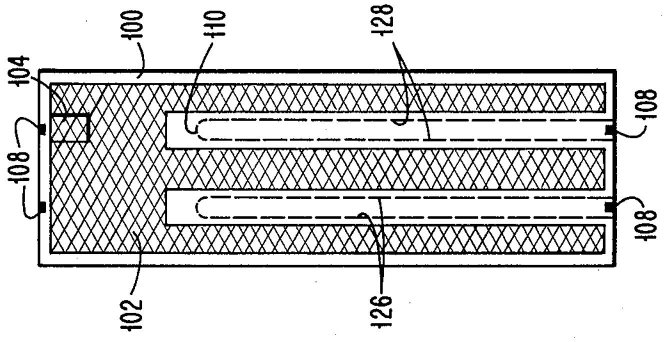
FIGS. 3 to 5 are cross-sectonal views of drop sensors.

Similarly, referring to FIG. 5, the back shield plane comprises metalized layer 102 deposited in the M pattern shown on ceramic substrate 100. Fiducials 108 are deposited for later use for alignment for grinding out slots 126 and 128. A pad 104 is provided for use in establishing electrical contact to ground plane 102.

Figure 4:
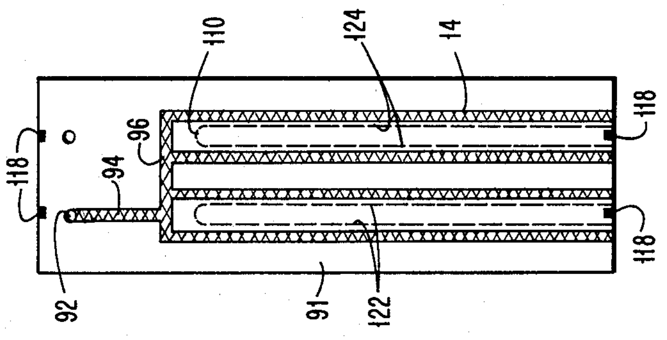

Referring to FIG. 4, a signal or antenna plane is shown. Metalized layer 14 is deposited around each area to be ground out for slots 122, 124, connected by a land pattern 96 to each other, and by land pattern 94 to via hole 92. Fiducials 118 are provided for alignment during grinding of slots 122, 124.

Figure 6:
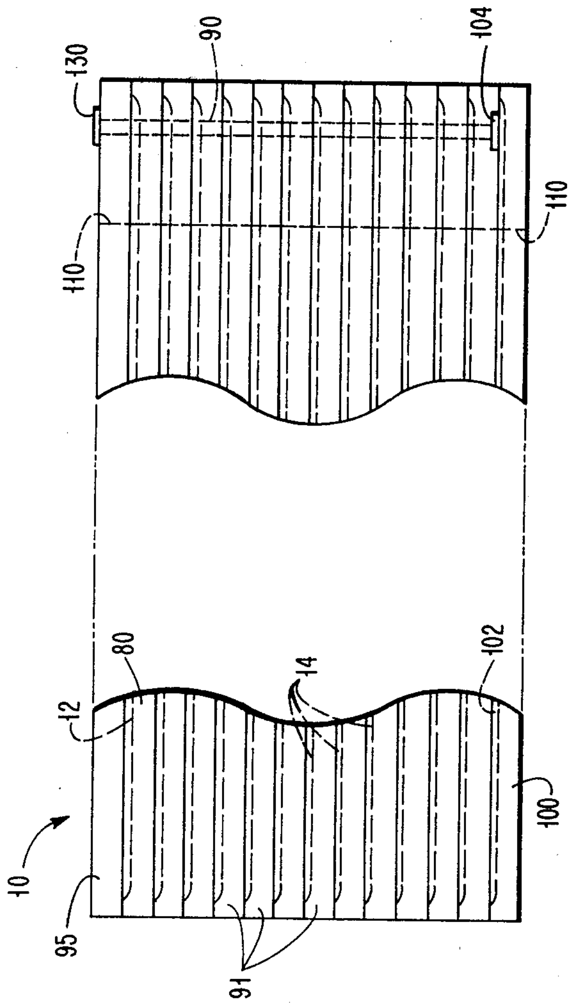
FIG. 6 is a diagramatic representation of the laminate structure of a sensor incorporating the shield planes of FIGS. 3 and 5, and the signal plane of FIG. 4.

Referring to FIG. 6, a multi-layer structure including a front shield plane 12, a back shield plane 102, and a plurality of sensor antenna planes 14—all deposited in ceramic substrates 80, 100, and 91 respectively, are stacked, aligned,, and fired at a high temperature to provide a solid block structure, including via connectors 92, 130. A dummy layer 95 is shown in the block above the front face—but could just as well be beneath the back face, depending upon which surfaces the conductive patterns are deposited. Slots 13 are then ground to complete the fabrication of sensor 10.

This structure of electrostatic drop sensor 10, together with the sensor electronics of FIG. 1, is used to determine if streams 11 are actually issuing from the print head (not shown), and for other purposes. The normal operation of sensor 10 yields drop flight time data. By connecting together the outermost ground shields 12, 102, a distributive capacitance is formed between the shields 12, 102 and the inner, antenna layers 14 of sensor 10. This capacitance is utilized to couple into sensor antenna plates 14 an electrical charge similar to the normal drop fly-by signal, thus providing a self-test feature for sensor 10 as an aid to fault isolation in the ink jet print system.

While the invention has been particularly shown and described with respect to a preferred embodiment thereof, it will be understood by those skilled in the art that various changes in form and detail may be made without departing from the spirit and scope of the invention.

What is claimed is:

1. An electrostatic drop sensor apparatus for ink jet printers, comprising:

sensor element means having an aperture through which capacitively charged ink drops are propelled for generating a charge induced by capacitive coupling of the ink drops; and sensor shield meas selectively operable for shielding said sensor element means from external fields and for capacitively inducing into said sensor element means a test signal.

2. In an ink jet recording system including an ink supply, a nozzle, means for projecting a high pressure ink stream from said nozzle which breaks up into drops downstream therefrom, means for applying an electrostatic charge to individual drops as they break off from the stream, the improvement providing self-testing means for establishing the flight time of a drop by sensing the arrival of a charged drop at a predetermined position spaced from said nozzle, comprising:

drop sensor means responsive to capacitively coupled charges from an electrostatically charged ink drop for developing an output signal; and conductor means selectively operable during normal operation mode for shielding said drop sensor means from electrical noise, and during test mode for coupling a test charge to said drop sensor means.

3. The system of claim 2 wherein said test charge is coupled to said drop sensor means by distributive capacitance between said drop sensor means and said conductor means.

4. Dual-function circuit means for detecting the charge on drops in an ink jet stream without contacting the stream and for testing the components of the means for detecting, comprising:

drop sensor means comprising a plurality of spaced conductive members on opposite sides of said ink jet stream, and amplifier circuit means for developing an output signal in response to capacitively coupled charges from an electrostatically charged ink drop from said ink jet stream passing said sensor;

an electrical signal source for generating a drop simulating signal;

switching means for selectively connecting at least one of said conductive members on each side of said ink jet stream either to a reference potential or to said electrical signal source; and means for setting said switching means to connect said at least one of said conductive members to a reference potential during normal operation to enable said drop sensor means to produce a signal every time when each group of charged ink drops pass said drop sensor means, and for setting said switching means to connect said at least one of said conductive members to said electrical signal source during diagnostic operation to capacitively induce a signal into the other of said conductive members to provide a test output signal for said drop sensor means.

5. A sensor system for ink jet printers for providing an output signal selectively indicative of the arrival of a charged drop at a predetermined position in an ink jet stream, and of the proper operation of at least part of the sensor system, comprising:

sensor means for sensing a charged drop and for developing an output signal responsive thereto; and shield means selectively operable for shielding said sensor means and for coupling a test signal to said sensor means.

6. The system of claim 5, wherein said drop is electrostatically charged, and said sensor means is responsive to a capacitively coupled charge from an electrostatically charged ink drop.

7. The system of claim 6, wherein said sensor means comprises a plurality of spaced conductive members on opposite sides of the flight path of a drop.

8. The system of claim 6, further comprising:

electrical signal source means for generating the test signal; and switching means for selectively connecting said shield means to a reference voltage for shielding said sensor means and to said electrical signal source means for capacitively inducing the test signal into said sensor means.

9. The system of claim 7, wherein said sensor means further comprises operational amplifier means for amplifying the output signal, and further comprising:

electrical signal source means for generating the test signal; and switching means selectively for connecting said shield means to a reference voltage for shielding said sensor means, for connecting said electrical signal source means for capacitively inducing the test signal into said sensor means, and for connecting said electrical signal source means to said operational amplifier means.

10. A sensor system for ink jet printers for providing an output signal selectively indicative of the arrival of an electrostatically charged drop at a predetermined position in an ink jet stream, and of the proper operation of said sensor system, comprising:

sensor means responsive to a capacitively coupled charge for generating an output signal, the sensor including a plurality of spaced conductors;

signal means for generating a drop simulating signal; and switching means for selectively connecting at least one of said conductive members to a reference potential for conditioning the other of said conductive members to produce said output signal in response to an electrostatically charged drop, and to said signal means for capacitively inducing said drop simulating signal into the other of said conductive members to produce an output signal indicative of the proper operation of said sensor system.

11. A method for operating an electrostatic drop sensor including a plurality of spaced conductors between which electrostatically charged drops are propelled, comprising the steps of:

connecting at least one of said conductors to a reference potential for conditioning the other of said conductors to produce an output signal in response to passage of an electrostatically charged drop;

connecting at least one of said conductors to a test signal for capacitively inducing a drop simulating signal into the other of said conductors to produce an output signal indicative of the proper operation of said sensor.

* * * * *